Oct. 18, 1932.  A. A. ROSS  1,883,825
YIELDABLE CONNECTION
Filed Oct. 1, 1931

Inventor:
Aubrey A. Ross,
by Charles E. Mullan
His Attorney.

Patented Oct. 18, 1932

1,883,825

UNITED STATES PATENT OFFICE

AUBREY A. ROSS, OF MARBLEHEAD, MASSACHUSETTS, ASSIGNOR TO GENERAL ELECTRIC COMPANY, A CORPORATION OF NEW YORK

YIELDABLE CONNECTION

Application filed October 1, 1931. Serial No. 566,355.

The present invention relates to yieldable connections for use between concentrically arranged driving and driven members, such as, for example, between the hub and rim of a gear wheel or pinion, or between two members forming a coupling.

The object of my invention is to provide an improved construction and arrangement in a device of this character, and for a consideration of what I believe to be novel and my invention, attention is directed to the following specification and to the claims appended thereto.

The invention is especially well adapted for spur gears such as, for example, railway gears, and I have specifically illustrated and described my invention in connection with spur gears. It is to be understood, however, that this is only by way of example and that the invention is not limited thereto especially.

Figure 1:
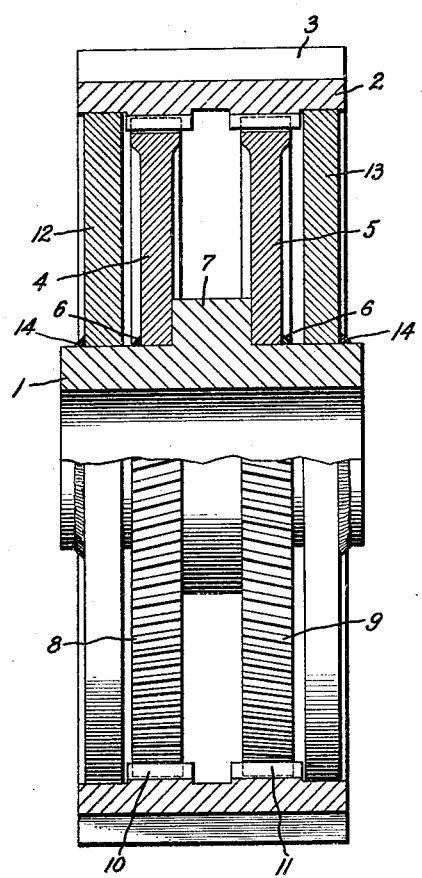
Figure 2:
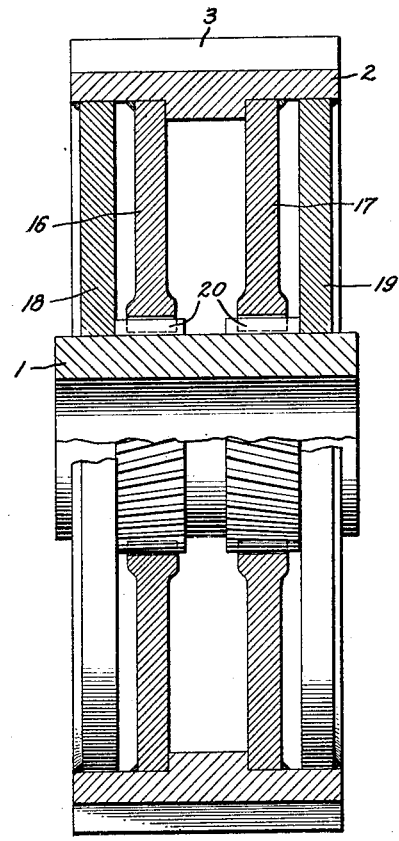
Figure 3:
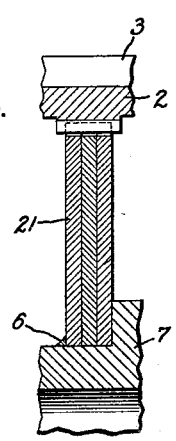

In the drawing, Fig. 1 is a view, partly in section, of a gear wheel embodying my invention; Fig. 2 is a similar view of a modification, and Fig. 3 shows a further modification.

Referring to the drawing, Fig. 1, 1 indicates the hub of a gear wheel and 2 indicates the rim thereof, the rim being provided with spur teeth 3. The hub and the rim may be considered as being driving and driven members, and it is between these members that my improved yieldable connection is arranged.

According to my invention I provide axially yieldable members which may be in the form of solid or laminated plates or in the form of spokes or a spider, and I connect such axially yieldable members to the hub and rim through the intermediary of helical gear teeth. With this arrangement when turning movement is transmitted between the hub and rim the connecting members yield axially somewhat, because of the axial component of the force due to the helical angle of the gear teeth, and this axial movement of the connecting members permits of a circumferential yielding movement of the rim and hub relatively to each other.

Referring specifically to Fig. 1, the hub and rim are connected together by two plates 4 and 5. Plates 4 and 5 are connected rigidly to hub 1 by suitable means, such as by welding, as indicated at 6, and are positioned by means of the central shoulder 7 of the hub. At their peripheries, plates 4 and 5 are provided with helical teeth 8 and 9 which mesh with helical teeth 10 and 11 on the inner surface of rim 2. Helical teeth 8 extend at an angle opposite to that of helical teeth 9 so that together there are provided double helical or herringbone teeth. Due to the angle of teeth 8 and 9, when turning load is applied between the hub and the rim there is an axial component of force which tends to deflect the members 4 and 5 in an axial direction, and any deflection axially permits relative circumferential movement to occur between hub 1 and rim 2. For any given load, the amount of axial movement or deflection of members 4 and 5 and hence the amount of relative circumferential movement between the hub and the rim depends upon the flexibility of the disks 4 and 5 and the angle of the helical teeth 8 and 9. Members 4 and 5 will deflect toward each other or away from each other depending upon the direction of rotation.

It is desirable that the hub and rim be held concentric relatively to each other and for this purpose I provide the plates 12 and 13 which are fixed rigidly to the hub by suitable means such as by welding, as is indicated at 14, and have a sliding fit with the underside of rim 2. This arrangement permits the rim and hub to move circumferentially relatively to each other, the rim sliding on the peripheries of plates 12 and 13, and holds the rim concentric with the hub.

Fig. 2 shows a modification of my invention wherein the members 16 and 17 and the plates 18 and 19, corresponding respectively to members 4 and 5 and plates 12 and 13 of Fig. 1, are rigidly fixed to the rim instead of to the hub, the arrangement thus being the reverse of that shown in Fig. 1. In Fig. 2, 20 indicates the helical toothed connection between members 16 and 17 and the hub. The operation of the arrangement shown in Fig. 2 is similar to that of Fig. 1.

In Fig. 3 is shown a modification wherein the members 21, corresponding to members 4 and 5 of Fig. 1, are formed of a number of thin metal plates, thus providing a laminated construction. A laminated construction may be advantageous in some instances in that greater flexibility with the same thickness of the members may be obtained.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:

1. In combination, concentric driving and driven elements and means connecting them comprising axially flexible members which are rigidly connected to one of said elements and connected through the intermediary of helical teeth to the other of said elements.

2. In combination, concentric driving and driven elements and means connecting them comprising axially flexible members which are rigidly connected to one of said elements and connected through the intermediary of helical teeth to the other of said elements, and means for holding the driving and driven elements concentric relatively to each other.

3. In combination, concentric driving and driven elements, plates connected rigidly to one of said elements and having a sliding fit with the other element, and axially yieldable members connected rigidly to one of said elements and connected to the other element by helical teeth.

4. In combination, a hub element, a rim element, double helical teeth on one of said elements, and axially deflectible members connected rigidly to the other of said elements and provided with helical teeth engaging the helical teeth on the one element.

5. In combination, a hub element, a rim element, double helical teeth on one of said elements, axially deflectible members connected rigidly to the other of said elements and provided with helical teeth engaging the helical teeth on the one element, and means for holding said hub element and rim element concentric relatively to each other.

In witness whereof, I have hereunto set my hand.

AUBREY A. ROSS.